United States Patent
Konoshima (10) Patent No.: US 9,300,983 B2
(45) Date of Patent: Mar. 29, 2016

(54) MOVING PICTURE DATA COMPARING METHOD AND APPARATUS

(71) Applicant: FUJITSU LIMITED, Kawasaki-shi, Kanagawa (JP)

(72) Inventor: Makiko Konoshima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 14/157,634

(22) Filed: Jan. 17, 2014

(65) Prior Publication Data

US 2014/0294095 A1    Oct. 2, 2014

(30) Foreign Application Priority Data

Mar. 26, 2013   (JP) .................................. 2013-065049

(51) Int. Cl.
| | |
|---|---|
| *H04N 7/12* | (2006.01) |
| *H04N 7/173* | (2011.01) |
| *H04N 19/87* | (2014.01) |
| *G06K 9/00* | (2006.01) |
| *H04N 19/48* | (2014.01) |

(52) U.S. Cl.
CPC ............ *H04N 19/87* (2014.11); *G06K 9/00758* (2013.01); *H04N 19/48* (2014.11)

(58) Field of Classification Search
CPC .. H04N 19/00921; H04N 19/87; H04N 19/48
See application file for complete search history.

(56) References Cited

U.S. PATENT DOCUMENTS

| | | | |
|---|---|---|---|
| 2005/0100219 A1 | 5/2005 | Berkner et al. | |
| 2007/0098084 A1* | 5/2007 | Kubota | H04N 5/147 375/240.26 |
| 2010/0061697 A1 | 3/2010 | Yasuda | |
| 2010/0134693 A1* | 6/2010 | Lee | G06F 17/30802 348/708 |
| 2010/0138419 A1* | 6/2010 | Kim | G06F 17/30817 707/737 |
| 2012/0320966 A1* | 12/2012 | Guo | H04N 5/46 375/240.02 |

FOREIGN PATENT DOCUMENTS

| | | |
|---|---|---|
| JP | 2005-141758 | 6/2005 |
| WO | 2008/132774 | 11/2008 |

* cited by examiner

*Primary Examiner* — Heather Jones
*Assistant Examiner* — Tsion B Owens
(74) *Attorney, Agent, or Firm* — Fujitsu Patent Center (57) ABSTRACT

A method comprises extracting a picture type and size per picture frame from encoded first moving picture data, calculating a first characteristic quantity per picture frame and a first variation point indicating a variation point of the first characteristic quantity on the basis of the extracted picture type and size, extracting a picture type and size per picture frame from encoded second moving picture data, calculating a second characteristic quantity per picture frame and a second variation point indicating a variation point of the second characteristic quantity on the basis of the extracted picture type and size, and comparing the first characteristic quantity and variation point with the second characteristic quantity and variation point, and determining whether or not the first moving picture is similar to the second moving picture.

6 Claims, 10 Drawing Sheets

| PICTURE NUMBER n | PICTURE TYPE Pn | SIZE Sn |
|---|---|---|
| 1 | I | 50 |
| 2 | B | 10 |
| 3 | B | 15 |
| 4 | P | 30 |
| 5 | B | 12 |
| 6 | B | 20 |
| 7 | P | 38 |
| 8 | B | 17 |
| 9 | B | 5 |
| 10 | P | 25 |
| ... | ... | ... |

MOVING PICTURE DATA Ma (30 FRAMES/SEC)

| M1 | M2 | M3 | M4 | M5 | M6 | M7 | ••• |

MOVING PICTURE DATA Na (24 FRAMES/SEC)

| N1 | N2 | N3 | N4 | N5 | ••• |

TIME ↑

MOVING PICTURE DATA Mb (120 FRAMES/SEC)

| M1 | M1 | M1 | M1 | M2 | M2 | M2 | M2 | M3 | M3 | M3 | M3 | M4 | M4 | M4 | M4 | M5 | M5 | M5 | M5 | M6 | M6 | M6 | M6 | M7 | M7 | M7 | M7 | ••• |

MOVING PICTURE DATA Nb (120 FRAMES/SEC)

| N1 | N1 | N1 | N1 | N1 | N2 | N2 | N2 | N2 | N2 | N3 | N3 | N3 | N3 | N3 | N4 | N4 | N4 | N4 | N4 | N5 | N5 | N5 | N5 | N5 | ••• |

TIME ↑

MOVING PICTURE DATA COMPARING METHOD AND APPARATUS

CROSS-REFERENCE TO RELATED APPLICATION

This application is based upon and claims the benefit of priority of the prior Japanese Patent Application No. 2013-065049, filed on Mar. 26, 2013, the entire contents of which are incorporated herein by reference.

FIELD

The present invention relates to a moving picture data comparing method and a moving picture data comparing apparatus.

BACKGROUND

It is desired in terms of preventing a leakage of information etc to check whether or not a content (moving picture) of moving picture data etc streaming on a network is similar to a content of predetermined moving picture data. A terminology of "similar or similarity" embraces "coincident or coincidence".

A majority of moving picture data (moving picture files) streaming on the network undergo an encoding process in order to compress data sizes. Further, the moving picture data provided through a majority of recording mediums are also encode-processed.

Even in the case of the same moving pictures, if encoding methods, compression rates, etc thereof are different, the encode-processed moving picture data are different from each other. It is therefore difficult to determine whether or not the content (moving picture) of one set of moving picture data is similar to the content (moving picture) of another set of moving picture data by comparing the encode-processed moving picture data with each other.

DOCUMENTS OF PRIOR ARTS

Patent Document

[Patent document 1] Japanese Laid-Open Patent Publication No. 2005-141758
[Patent document 2] International Publication Pamphlet No. WO2008/132774

SUMMARY

According to an aspect of embodiments, a computer executes: extracting a picture type per picture frame and a picture size per picture frame from first moving picture data given by encoding a moving picture including a plurality of picture frames; calculating a first characteristic quantity per picture frame of the first moving picture data and a first variation point indicating a variation point of the first characteristic quantity on the basis of the extracted picture type per picture frame of the first moving picture data and the extracted picture size per picture frame of the first moving picture data; extracting a picture type per picture frame and a picture size per picture frame from second moving picture data given by encoding a moving picture having a plurality of picture frames; calculating a second characteristic quantity per picture frame of the second moving picture data and a second variation point indicating a variation point of the second characteristic quantity on the basis of the extracted picture type per picture frame of the second moving picture data and the extracted picture size per picture frame of the second moving picture data; and comparing the first characteristic quantity and the first variation point with the second characteristic quantity and the second variation point, and thus determining whether or not the moving picture of the first moving picture data is similar to the moving picture of the second moving picture data.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

An embodiment will hereinafter be described with reference to the drawings. A configuration of the embodiment is an exemplification, and a configuration of the disclosure is not limited to a specific configuration of the embodiment of the disclosure. On the occasion of carrying out the configuration of the disclosure, the specific configuration corresponding to the embodiment may be properly adopted.

It is desired for determining whether or not the contents (moving pictures contained in moving picture files) of the two sets of encode-processed moving picture data are similar to each other to apply a decoding process to these two sets of moving picture data and to compare the decode-processed data with each other.

Characteristic quantities of the moving pictures are extracted from the decode-processed moving picture data (the moving picture data not encoded) and compared with each other, thereby determining whether similar or not.

The decoding process is, however, large in arithmetic load, and hence it is difficult to perform a process of comparing amass amount of encode-processed moving picture files.

Embodiment

Properties of Moving Picture

Properties of moving pictures are exemplified such as a "magnitude of motion", a "complexity of pattern" and a "complexity of motion". Each of the "magnitude of motion", the "complexity of pattern" and the "complexity of motion" is defined as a scalar quantity. These properties of the moving pictures do not substantially depend on the coding standards for moving pictures. Namely, the properties of the moving pictures are hard to change even when encoded by whatever coding standards. If two moving pictures are similar to each other in terms of the "magnitude of motion", the "complexity of pattern" and the "complexity of motion", these two moving pictures are determined to be similar.

Respective pictures of moving picture data (moving picture file) generated by applying an encoding process to a moving picture are classified into I-pictures, P-pictures and B-pictures. The moving picture file undergoing the encoding process has I-pictures, P-pictures and B-pictures. An I-picture is defined as an intra-coded picture. The intra-coded picture is encoded independently without referring to other pictures. A P-picture is defined as a predictive-coded picture. The predictive-coded picture is encoded by exploiting a motion compensating prediction from the previous intra-coded picture or the previous predictive-coded picture. The predictive-coded picture is generally used for a reference to a further prediction. A B-picture is defined as a bidirectionally predictive-coded picture. The bidirectionally predictive-coded picture is encoded by exploiting a motion compensating prediction from the previous and forward intra-coded pictures or the previous and forward predictive-coded pictures. The bidirectionally predictive-coded picture is not used as a reference picture for the prediction.

A moving picture file, which has undergone the encoding process, is encoded on a picture-by-picture basis. Accordingly, in an information processing apparatus, even when not applying any decoding process to the encode-processed moving picture file, sizes (capacities of the respective pictures) of the individual pictures of the encode-processed moving picture file can be acquired.

When the magnitude of motion increases, there is a tendency that a size ratio of the B-picture becomes larger. When the complicity of pattern rises, there is a tendency that a size ratio of the I-picture becomes larger. When the complexity of motion rises, there is a tendency that a size ratio of the P-picture becomes larger. Further, the size ratios of the I-picture, the P-picture and the B-picture depend on the coding standards of the moving pictures.

Hence, the size ratios of the I-picture, the P-picture and the B-picture depend on the "magnitude of motion", the "complexity of pattern" and the "complexity of motion" defined as the properties of the moving pictures and also on the coding standards thereof. It is herein assumed that vectors having three components such as an I-picture size ($I_{size}$), a P-picture size ($P_{size}$) and a B-picture size ($B_{size}$) of a certain encoded moving picture are expressed as follows by use of three functions with a, b and c being variables. It is here also assumed that a standard p is used as the encoding standard. The three functions are $f_I(a, b, c)$, $f_P(a, b, c)$ and $f_B(a, b, c)$. The vector having the three components of $I_{size}$, $P_{size}$ and $B_{size}$ is called a size vector. Herein, the symbols a, b and c represent the "magnitude of motion", the "complexity of pattern" and the "complexity of motion", respectively.

[Mathematical Expression 1]

$$\frac{1}{\sqrt{I_{size}^2 + P_{size}^2 + B_{size}^2}} \begin{pmatrix} I_{size} \\ P_{size} \\ B_{size} \end{pmatrix} = X_P \begin{pmatrix} f_I(a, b, c) \\ f_P(a, b, c) \\ f_B(a, b, c) \end{pmatrix} \quad (1)$$

Let $X_P$ be a matrix depending on the encoding standard p. The functions $f_I(a, b, c)$ $f_P(a, b, c)$ and $f_B(a, b, c)$ may be defined so that the matrix $X_P$ becomes a unit matrix with respect to the encoding standard p. A magnitude of the size vector depends on a compression rate on the occasion of encoding. A direction of the size vector depends on the properties of the moving picture because of the size vector being expressed by the functions of the "magnitude of motion", the "complexity of pattern" and the "complexity of motion". Namely, the two sets of moving picture data with the directions of the size vectors being similar to each other are determined to have a high possibility of their being encoded from the same moving picture.

On the other hand, let $I_{qsize}$, $P_{qsize}$ and $B_{qsize}$ be an I-picture size, a P-picture size and a B-picture size of the moving picture encoded based on the encoding standard p, the expression thereof is given as follows:

[Mathematical Expression 2]

$$\frac{1}{\sqrt{I_{qsize}^2 + P_{qsize}^2 + B_{qsize}^2}} \begin{pmatrix} I_{qsize} \\ P_{qsize} \\ B_{qsize} \end{pmatrix} = X_q \begin{pmatrix} f_I(a, b, c) \\ f_P(a, b, c) \\ f_B(a, b, c) \end{pmatrix} \quad (2)$$

Let $X_q$ be a matrix depending on an encoding standard q. Supposing herein that a, b and c take the same values both in the expression (1) and in the expression (2), the following relational expression can be drawn out.

[Mathematical Expression 3]

$$\begin{pmatrix} I_{size} \\ P_{size} \\ B_{size} \end{pmatrix} = \frac{\sqrt{I_{size}^2 + P_{size}^2 + B_{size}^2}}{\sqrt{I_{qsize}^2 + P_{qsize}^2 + B_{qsize}^2}} X_p X_q^{-1} \begin{pmatrix} I_{qsize} \\ P_{qsize} \\ B_{qsize} \end{pmatrix} \quad (3)$$

The expression (3) does not depend on a, b and c. Namely, the expression (3) does not depend on the properties of the moving picture. Further, a relationship between the encoding standard p and the encoding standard q can be expressed by a matrix $X_p X_q^{-1}$. The known moving picture is encoded by the encoding standard p and the encoding standard q, and the relationship between the encoding standard p and the encoding standard q is known from the expression (3) by using the respective sizes of the I-picture, the P-picture and the B-picture of the moving picture data. That is, the matrix $X_p X_q^{-1}$ is obtained beforehand. Herein, the matrix "$X_p X_q^{-1}$" is called a conversion matrix from the encoding standard q into the encoding standard p. Even when neither the matrix $X_p$ nor the matrix $X_q$ is obtained, the matrix $X_p X_q^{-1}$ is obtained by employing the moving picture acquired by encoding the known moving picture on the basis of the encoding standard p and the encoding standard q. That is, the conversion matrix can be calculated between the arbitrary standards. The conversion matrix may be given beforehand by a user. Moreover, the conversion matrix of each standard may also be prepared as a matrix converting the standard into a predetermined one standard on a standard-by-standard basis. With this contrivance, it follows that it may be sufficient for one conversion matrix to be prepared for one standard.

The following relationship is derived from the expression (3).

[Mathematical Expression 4]

$$\begin{pmatrix} I_{size} \\ P_{size} \\ B_{size} \end{pmatrix} // X_p X_q^{-1} \begin{pmatrix} I_{qsize} \\ P_{qsize} \\ B_{qsize} \end{pmatrix} \quad (4)$$

If the direction of the size vector of the moving picture data based on the encoding standard p is similar to such a direction given by multiplying the size vector of the moving picture data based on the encoding standard q by the conversion matrix from the standard q into the standard p, the moving pictures of the two sets of moving picture data are determined to be similar to each other.

The conversion matrix $X_p X_q^{-1}$ may also be a matrix in which component values other than a diagonal component are "0". For example, when the standard p is MPEG-2 (Moving Picture Experts Group-2), while the standard q is H.264, the conversion matrix $X_p X_q^{-1}$ is expressed as follows.

[Mathematical Expression 5]

$$X_p X_q^{-1} = \begin{pmatrix} 1.14 & 0 & 0 \\ 0 & 1.10 & 0 \\ 0 & 0 & 0.63 \end{pmatrix} \quad (5)$$

Further, at this time, a conversion matrix $X_q X_p^{-1}$ from the standard p into the standard q is expressed as follows.

[Mathematical Expression 6]

$$X_q X_p^{-1} = \begin{pmatrix} \frac{1}{1.14} & 0 & 0 \\ 0 & \frac{1}{1.10} & 0 \\ 0 & 0 & \frac{1}{0.63} \end{pmatrix} \quad (6)$$

The standard p and the standard q are different from each other in terms of their encoding standards. The standard p and the standard q may be the same in terms of their encoding standards but different in terms of their compression rates, resolutions, etc. The standard p and the standard q may be the same standards. The conversion matrix between the same standards becomes the unit matrix.

Figure 1:
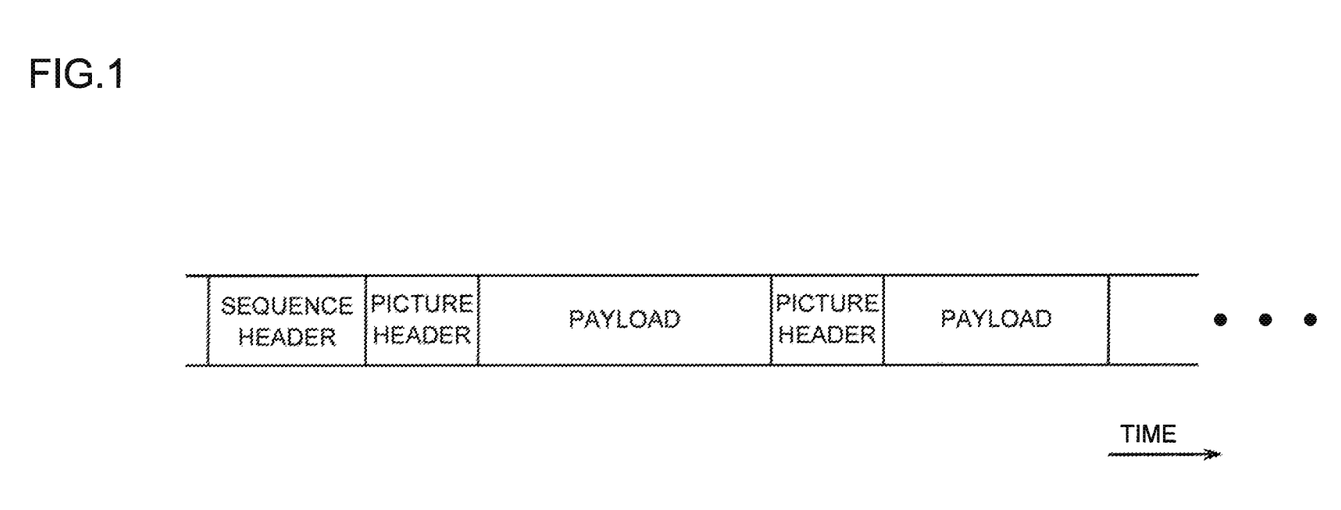
FIG. 1 is a diagram illustrating an example (1) of a stream structure of moving picture data.

FIG. 1 is a diagram illustrating an example (1) of a stream structure of the moving picture data. In the example of FIG. 1, the stream structure of the moving picture data is built up by fields such as a sequence header, a picture header, a payload, a picture header and a payload that are arranged in this sequence. The sequence header contains items of information such as an encoding method, a picture size, an aspect ratio, a frame rate and a bit rate. The picture header contains picture type information specifying which picture, the I-picture or the P-picture or the B-picture, the picture (image) data contained in the subsequent payload corresponds to. The payload contains the picture data. A size of the payload is known from a difference between a head position of the payload and a head position of the next picture header. Namely, a size of one picture data is known therefrom. The payload size has a variable length.

Figure 2:
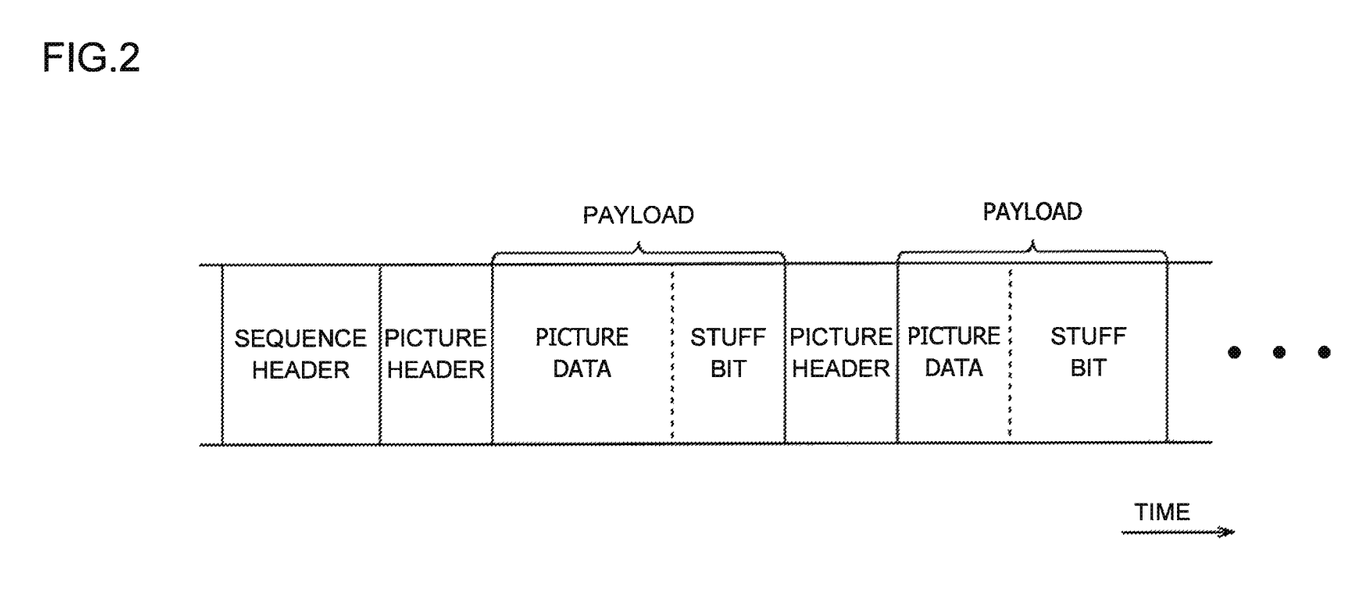
FIG. 2 is a diagram illustrating an example (2) of a stream structure of moving picture data.

FIG. 2 is a diagram illustrating an example (2) of a stream structure of the moving picture data. In the example of FIG. 2, the stream structure of the moving picture data is built up by the fields such as the sequence header, the picture header, the payload, the picture header and the payload arranged in this sequence. A different point from the example of FIG. 1 is that the payload contains the picture data and a stuff bit distinguishable from the data. The stuff bit is a part of the payload. The stuff bit (stuff code) has none of the picture information. The stuff bit is exemplified by, e.g., consecutive "0xff". In this case, the stuff bit can be easily specified from the payload. A stuff bit pattern can be presumed from the encoding method. In the case of the stuff bit being specified, a size given by subtracting a size of the stuff bit from the payload size is to be set as a picture data size.

FIGS. 1 and 2 illustrate the examples of the stream structures of the moving picture data, however, with respect to even a moving picture file not for streaming, the encoding method, the picture types (I, P, B), the picture data size, etc are similarly acquired.

Example of Configuration

Figure 3:
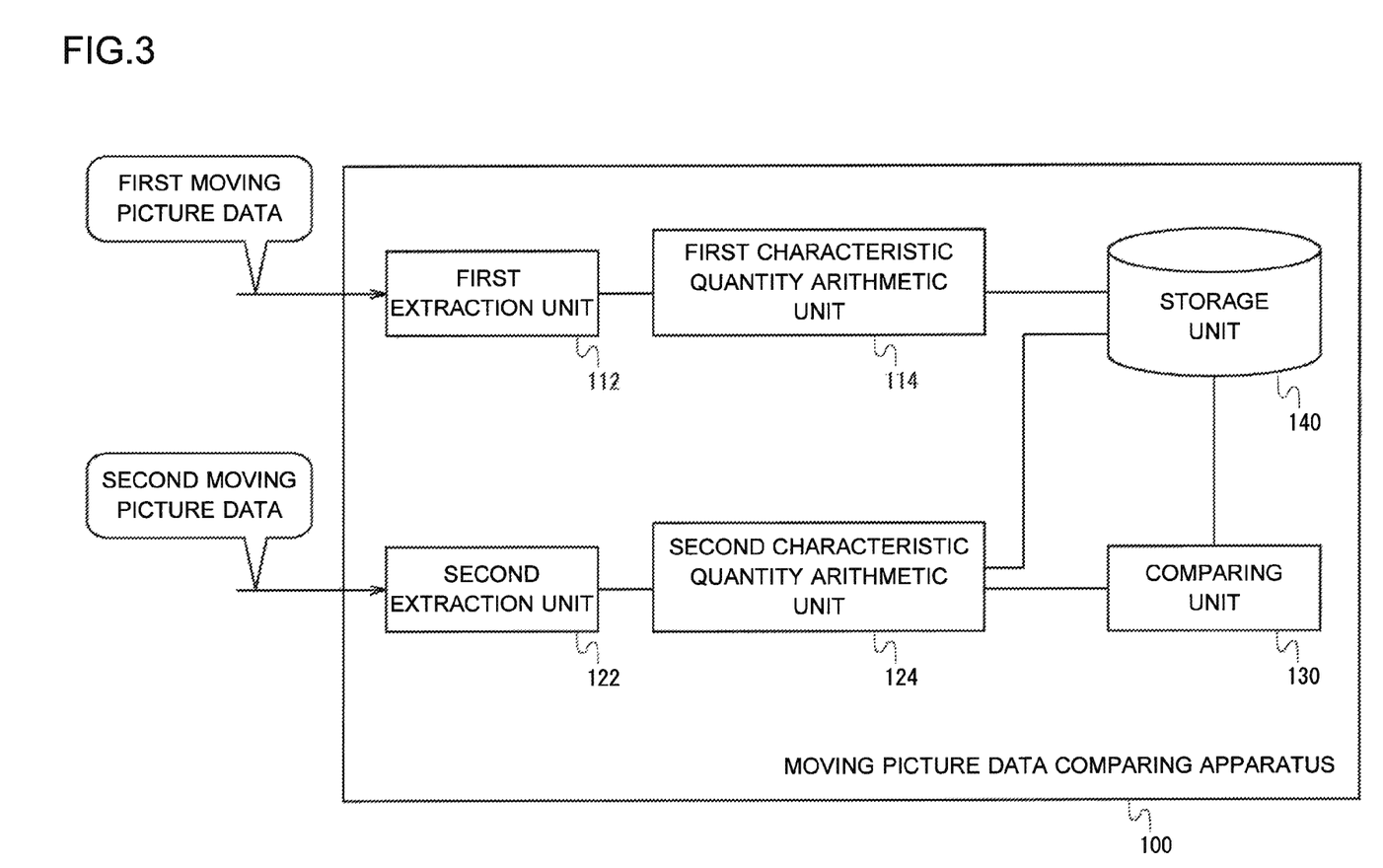
FIG. 3 is a diagram illustrating an example of a configuration of a moving picture data comparing apparatus.

FIG. 3 is a diagram illustrating an example of a configuration of a moving picture data comparing apparatus. A moving picture data comparing apparatus 100 in FIG. 3 includes a first extraction unit 112, a first characteristic quantity arithmetic unit 114, a second extraction unit 122, a second characteristic quantity arithmetic unit 124, a comparing unit 130 and a storage unit 140.

The moving picture data comparing apparatus 100 extracts a predetermined item of information from the moving picture data defined as a referenced picture data, and calculates a characteristic quantity etc on the basis of the extracted information. Further, the moving picture data comparing apparatus 100 extracts a predetermined item of information from the moving picture data defined as testing target picture data, and calculates a characteristic quantity etc on the basis of the extracted information. Still further, the moving picture data comparing apparatus 100 makes a comparison between the characteristic quantity etc of the referenced moving picture data and the characteristic quantity etc of the testing target moving picture data, and thus determines whether or not the moving picture of the testing target moving picture data is similar to the moving picture of the referenced moving picture data. The moving picture data dealt with herein have already undergone the encoding process and contain the I-pictures, the P-pictures and the B-pictures.

The first extraction unit 112 acquires first moving picture data defined as the referenced moving picture data. The first moving picture data may be streaming data that stream on a network and may also be a moving picture file recorded on a recording medium. The first extraction unit 112 extracts the sequence header from the first moving picture data. The first extraction unit 112 presumes the encoding method (standard) of the first moving picture data from the information contained in the sequence header. The first extraction unit 112 acquires a bit position (or time) of the picture header of the first moving picture data. The first extraction unit 112 extracts the picture type (the I-picture, the P-picture and the B-picture) from each picture header within the first moving picture data. The first extraction unit 112 acquires a size of the payload corresponding to each picture. Each payload size corresponds to a size of each picture. Moreover, if the stuff bit is specified from the payload, the first extraction unit 112 sets a size given by subtracting a size of the stuff bit from the payload size as a picture size. The picture type and the picture size are associated with a picture number or time. The picture numbers are serial numbers of the pictures, which are allocated in the time sequence. The first extraction unit 112 transmits the encoding method of the first moving picture data, the picture numbers, the picture types, the picture sizes, etc to the first characteristic quantity arithmetic unit 114. One picture number corresponds to one frame.

Figure 4:
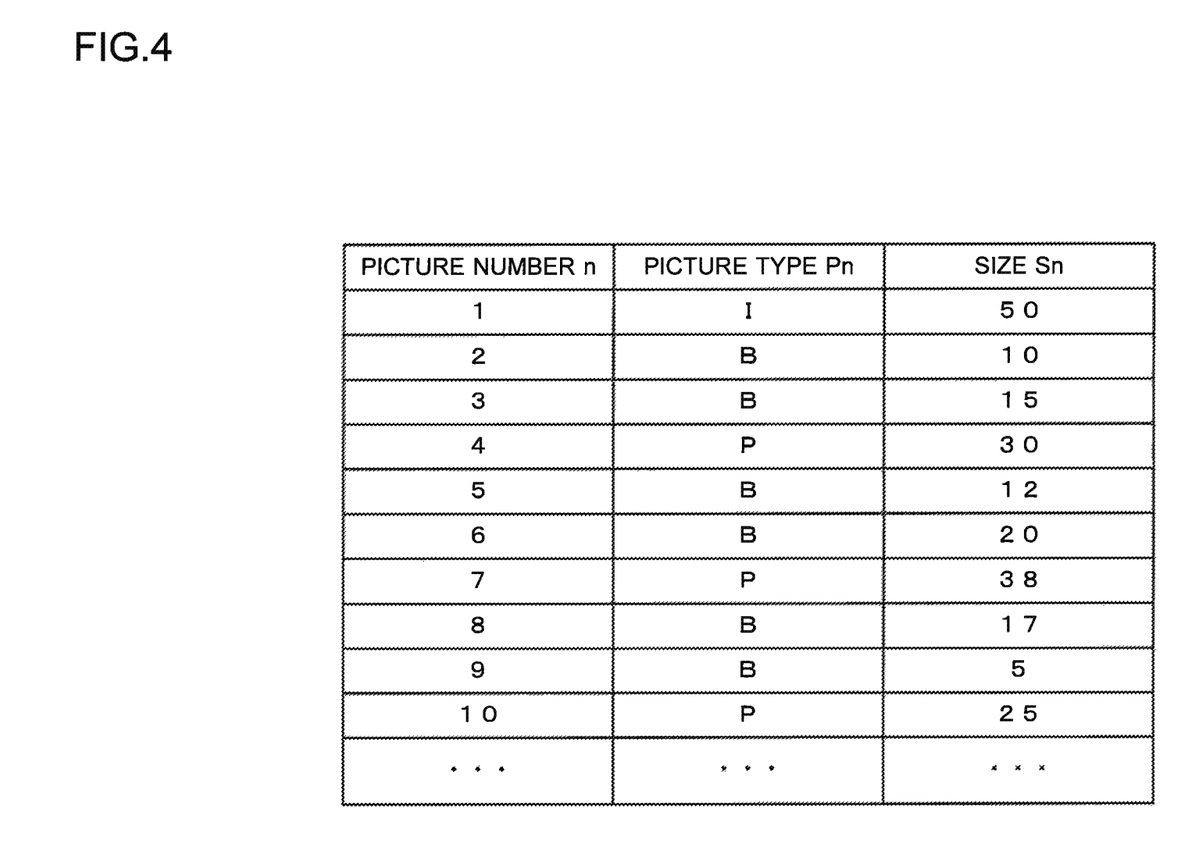
FIG. 4 is a diagram illustrating an example of items of information transmitted to a first characteristic quantity arithmetic unit from a first extraction unit.

FIG. 4 is a diagram illustrating an example of items of information transmitted to the first characteristic quantity arithmetic unit from the first extraction unit. The first extraction unit 112 transmits the picture number, the picture type and the picture size to the first characteristic quantity arithmetic unit 114 in the way of their being associated with each other as depicted in FIG. 4. The time may be used as a substitute for the picture number. For example, a value of the time is obtained by multiplying the picture number by time per frame (an inverse number of the bit rate).

The first characteristic quantity arithmetic unit 114 calculates a characteristic quantity, a variation point, etc of the first moving picture data on the basis of the items of information received from the first extraction unit 112. The first characteristic quantity arithmetic unit 114 stores the calculated characteristic quantity, variation point, etc in the storage unit 140.

The second extraction unit 122 acquires second moving picture data defined as the testing target moving picture data. The second moving picture data may be the streaming data that stream on the network and may also be the moving picture file recorded on the recording medium. The second extraction unit 122, similarly to the first extraction unit 112, acquires the encoding method, the picture number, the picture type and the picture size from the second moving picture data, and transmits these items of information to the second characteristic quantity arithmetic unit 124.

The second characteristic quantity arithmetic unit 124 calculates a characteristic quantity, a variation point, etc of the second moving picture data on the basis of the items of information received from the second extraction unit 122. The second characteristic quantity arithmetic unit 124 transmits the calculated characteristic quantity, variation point, etc to the comparing unit 130. The second characteristic quantity arithmetic unit 124 may store the calculated characteristic quantity, variation point, etc in the storage unit 140.

The comparing unit 130 makes comparisons between the characteristic quantity, the variation point, etc of the first moving picture data and the characteristic quantity, the variation point, etc of the second moving picture data, and thus determines whether or not the moving picture of the second moving picture data is similar to the moving picture of the first moving picture data. The comparing unit 130 acquires the characteristic quantity, the variation point, etc of the first moving picture data from the storage unit 140. The comparing unit 130 acquires the characteristic quantity, the variation point, etc of the second moving picture data from the second characteristic quantity arithmetic unit 124. The comparing unit 130 may acquire the characteristic quantity, the variation point, etc of the second moving picture data from the storage unit 140.

The storage unit 140 stores the characteristic quantity, the variation point, etc of the first moving picture data and with the characteristic quantity, the variation point, etc of the second moving picture data.

The moving picture data comparing apparatus 100 can be realized by using a general-purpose computer such as a personal computer (PC) or a dedicated computer such as a server machine. Moreover, the moving picture data comparing apparatus 100 can be realized by using a dedicated or general purpose computer such as a smartphone, a mobile phone and a car navigation system, or by using electronic equipment with the computer.

Figure 5:
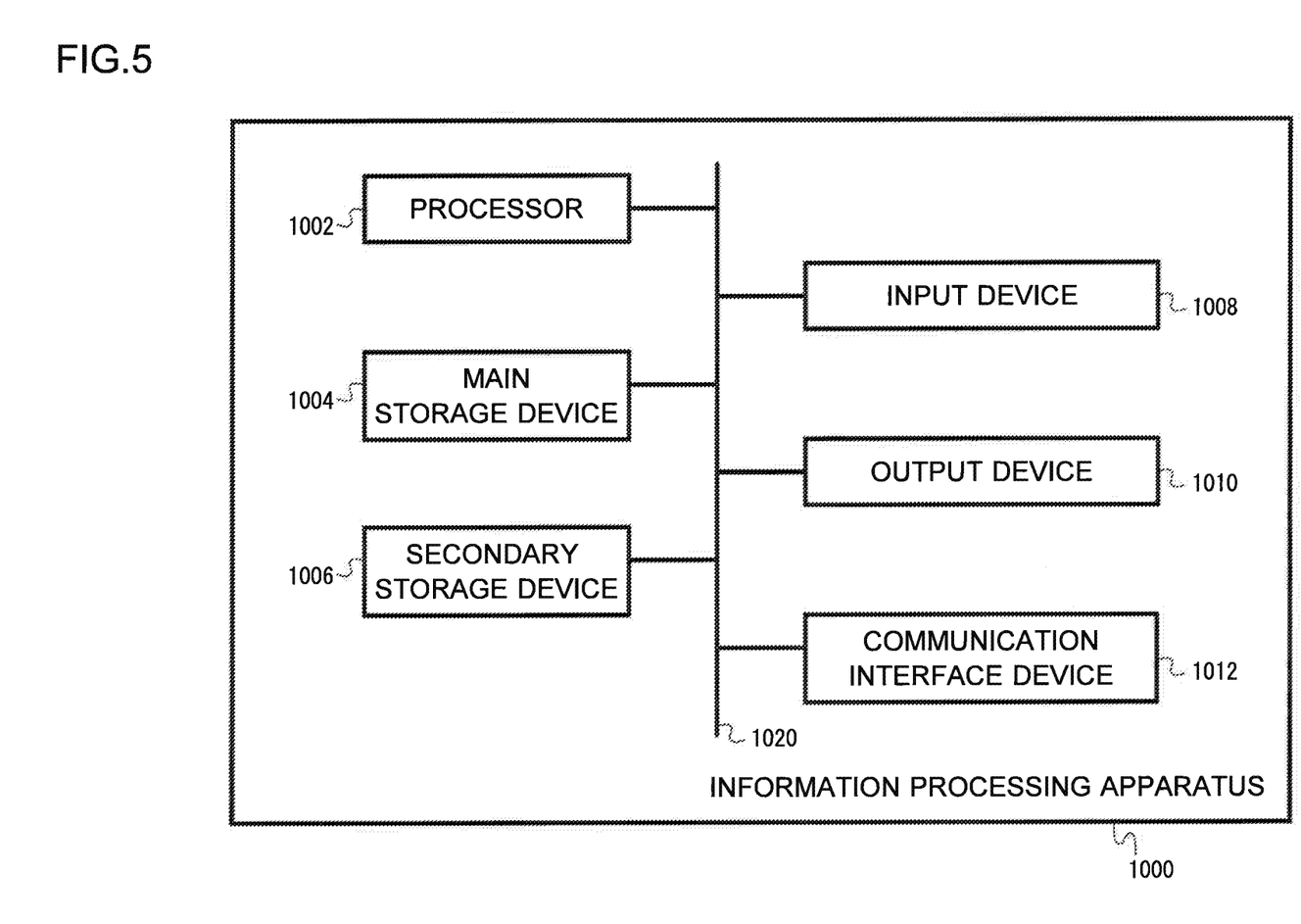
FIG. 5 is a diagram illustrating an example of an information processing apparatus to actualize the moving picture data comparing apparatus.

FIG. 5 is a diagram illustrating an example of an information processing apparatus to actualize the moving picture data comparing apparatus. The computer, i.e., an information processing apparatus 1000, includes a processor 1002, a main storage device 1004, a secondary storage device 1006 and an interface device with peripheral devices such as a communication interface device 1012. The main storage device and the secondary storage device are computer-readable recording mediums. The information processing apparatus 1000 includes an input device 1008 and an output device 1010. The respective components of the information processing apparatus 1000 are connected via a bus 1020.

The processor loads a program stored on the recording medium onto an operation area of the main storage device and executes the program, while the information processing apparatus and the peripheral devices are controlled through the execution of the program, whereby the computer can realize functions matching with predetermined purposes.

The processor 1002 is exemplified by, e.g., a CPU (Central Processing Unit) or a DSP (Digital Signal Processor). The main storage device 1004 includes, e.g., a RAM (Random Access Memory) and a ROM (Read Only Memory).

The secondary storage device 1006 is exemplified by, e.g., an EPROM (Erasable Programmable ROM) or a hard disk drive (HDD). Moreover, the secondary storage device 1006 can include a removable medium, i.e., a portable recording medium. The removable medium is a disk recording medium such as a USB (Universal Serial Bus) memory, a CD (Compact Disc) and a DVD (Digital Versatile Disc).

The communication interface device 1012 is exemplified such as a LAN (Local Area Network) interface board and a wireless communication circuit for wireless communications. The communication interface device is connected to the network. The communication interface device transmits and receives the data to and from other computers and other communication devices via the network.

The peripheral devices include, in addition to the secondary storage device and the communication interface device, input devices such as a keyboard and a pointing device, and also output devices such as a display device and a printer. The pointing device includes a mouse, a touch panel, a touch pad and a trackball, etc. Further, the input device can include an input device like a camera for inputting videos and images and an input device like a microphone for inputting sounds. Moreover, the output device can include an output device like a speaker for outputting the sounds.

The processor loads the program stored in the secondary storage device into the main storage device and executes the program, whereby the information processing apparatus 1000, which realizes the moving picture data comparing apparatus 100, implements functions as the first extraction unit 112, the first characteristic quantity arithmetic unit 114, the second extraction unit 122, the second characteristic quantity arithmetic unit 124 and the comparing unit 130. On the other hand, the storage unit 140 is provided in the storage area of the main storage device or the secondary storage device.

A series of processes can be, though executable by hardware, also executed by software.

Steps of describing the program include, as a matter of course, processes executed in time-series along the written sequence and also processes that are, though not necessarily processed in time-series, executed in parallel or individually.

The hardware components are hardware circuits, which are exemplified such as FPGA (Field Programmable Gate Array), an ASIC (Application Specific Integrated Circuit), agate array, a combination of logic gates, an analog circuit, and so on.

The software components are components for realizing the predetermined processes by software. The software component is not a concept that limits a language for actualizing the software, a development environment, etc.

Operational Example

Operational Example of First Extraction Unit

An operational example of the first extraction unit 112 will be described.

Figure 6:
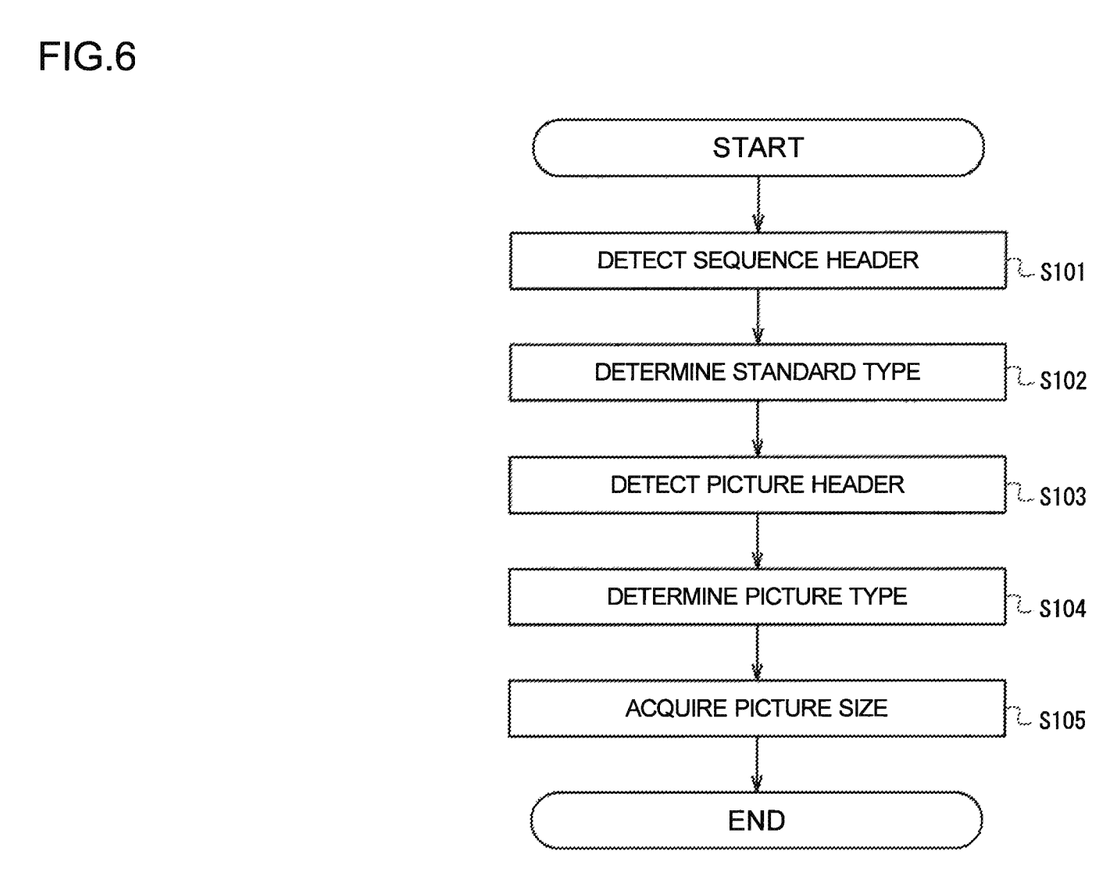
FIG. 6 is a flowchart illustrating an example of an operation flow of the first extraction unit.

FIG. 6 is a flowchart illustrating an example of an operation flow of the first extraction unit. A start of the operation flow in FIG. 6 is triggered by inputting the referenced moving picture data (first moving picture data) to the first extraction unit 112. The first moving picture data contain, as in FIG. 2 or FIG. 1, the sequence header, the picture header, the payload, etc. The first moving picture data are the moving picture data that are encode-processed by some type of encoding method.

The first extraction unit 112 detects the sequence header from the first moving picture data to be inputted (S101). The sequence header contains the items of information such as the encoding method, the picture size, the aspect ratio, the frame rate and the bit rate.

The first extraction unit 112 ascertains the encoding method (standard type) of the first moving picture data from the items of information contained in the sequence header (S102). The sequence header contains a unique standard number, and hence the first extraction unit 112 can ascertain the encoding method (standard type).

The first extraction unit 112 detects the picture header subsequent to the sequence header (S103). The first extraction unit 112 detects a bit position of each picture header, thus acquiring each picture header.

The first extraction unit 112 ascertains the picture type of the picture, which is contained in the payload subsequent to the picture header from the items of information contained in the picture header (S104). The picture type is information that specifies any one of the I-picture, the P-picture and the B-picture. Each picture type is identified by the picture number unique to each picture. Each picture type may be identified by the time information of the picture.

The first extraction unit 112 acquires the size of the payload corresponding to each picture. The payload size is obtained from, e.g., a bit count between the present picture header and the next picture header. The first extraction unit 112 acquires the payload size as the picture size (S105). Further, the first extraction unit 112, if capable of acquiring the stuff bit of the payload, sets a size given by subtracting a size of the stuff bit from the payload size as the picture size. The picture size is associated with the picture number and the picture type.

The first extraction unit 112 transmits the encoding method, the picture number, the picture type, the picture size, etc to the first characteristic quantity arithmetic unit 114.

An operation of the second extraction unit 122 is substantially the same as the operation of the first extraction unit 112.

Operational Example of First Characteristic Quantity Arithmetic Unit

An operational example of the first characteristic quantity arithmetic unit 114 will be described.

Figure 7:
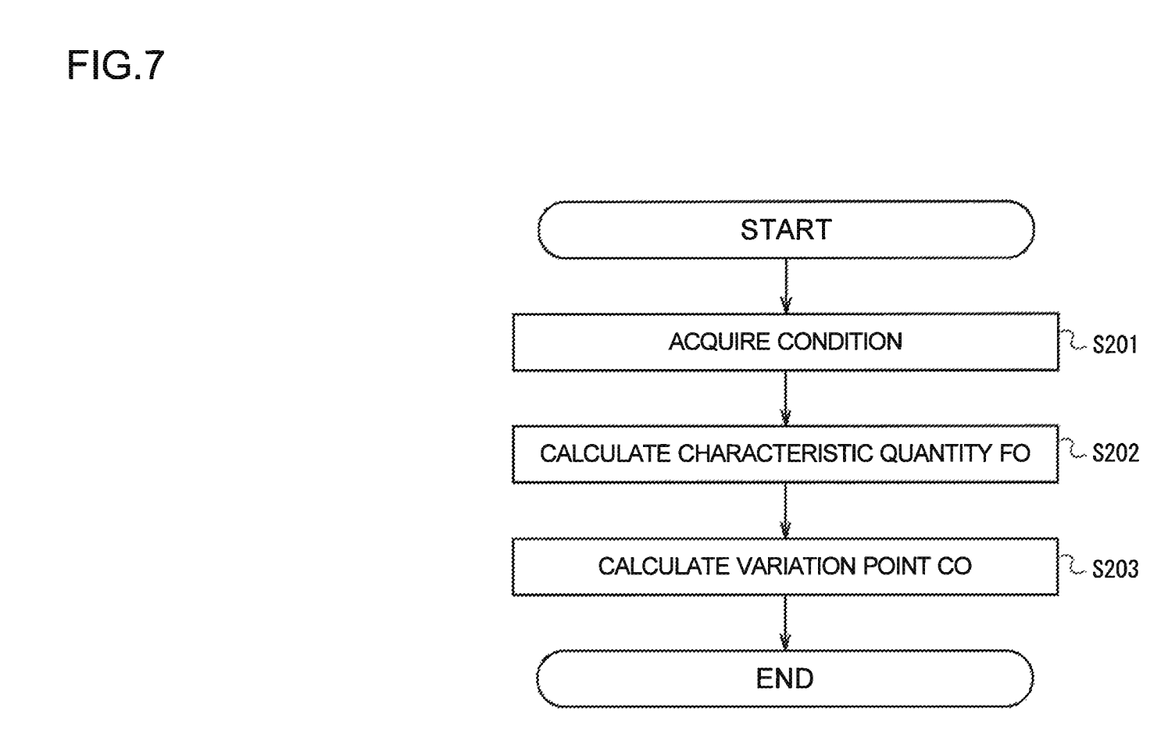
FIG. 7 is a flowchart illustrating an example of an operation flow of a first characteristic quantity arithmetic unit.

FIG. 7 is a flowchart illustrating an example of an operation flow of the first characteristic quantity arithmetic unit 114. A start of the operation flow in FIG. 7 is triggered by inputting the encoding method, the picture number, the picture type, the picture size, etc from the first extraction unit 112 to the first characteristic quantity arithmetic unit 114.

The first characteristic quantity arithmetic unit 114 acquires the encoding method, the picture number, the picture type, the picture size, etc. Further, the first characteristic quantity arithmetic unit 114 acquires conditions for calculating the characteristic quantity etc such as an observation range of the referenced moving picture data (S201). The observation range is a comparison target range with another moving picture data. The observation range is given as, e.g., a range of the picture number. A characteristic portion of the moving picture data, an important portion of the moving picture data, etc are selected as the observation ranges. The conditions for calculating the characteristic quantity etc such as the observation range are given by, e.g., the user. The conditions for calculating the characteristic quantity etc such as the observation range may be stored in the storage unit 140. The observation range extends for, e.g., several minutes.

The first characteristic quantity arithmetic unit 114 calculates, with respect to each picture number within the observation range, an average of the sizes of the I-pictures, an average of the sizes of the P-pictures and an average of the sizes of the B-pictures. With respect to a picture number n, a vector having three components of the average of the sizes of the I-pictures, the average of the sizes of the P-pictures and the average of the sizes of the B-pictures is assumed to be a characteristic quantity Fon. The average of the sizes of the I-pictures specified by the picture number n is to be an average of the sizes of k-frames of I-pictures counted from the side closer to the picture number n in the I-pictures classified by the picture type. The average of the sizes of the P-pictures specified by the picture number n is to be an average of the sizes of k-frames of P-pictures counted from the side closer to the picture number n in the P-pictures classified by the picture type. The average of the sizes of the B-pictures specified by the picture number n is to be an average of the sizes of k-frames of B-pictures counted from the side closer to the picture number n in the B-pictures classified by the picture type. Herein, a value "k" is one of the conditions for calculating the characteristic quantity etc. The first characteristic quantity arithmetic unit 114 calculates the characteristic quantities Fo with respect to all the picture numbers within the observation range (S202). The characteristic quantity Fo (vector) may be normalized to a magnitude "1". Moreover, the first characteristic quantity arithmetic unit 114 may set the average of the sizes of the I-pictures specified by the picture number n as an average of the sizes of all the I-pictures embraced by a range m peripheral to the picture number n. The same is applied to also the P-pictures and the B-pictures. One conversion matrix is prepared for one standard, in which case a vector given by multiplying the characteristic quantity Fo obtained herein by the conversion matrix corresponding to the encoding method of the first moving picture data, becomes a characteristic quantity Fo. The conversion matrix is one of the conditions for calculating the characteristic quantity etc.

The first characteristic quantity arithmetic unit 114 calculates a conversion pint Co of the characteristic quantity Fo (S203). The first characteristic quantity arithmetic unit 114 makes a comparison of an angular difference between the characteristic quantity Fon of the picture number n that is calculated in step S202 and a characteristic quantity Fon+1 of a picture number n+1. Both of the characteristic quantity Fon and the characteristic quantity Fon+1 are vectors, and hence an angular difference θon is obtained as follows.

[Mathematical Expression 7]

$$\theta_{on} = \cos^{-1}\left(\frac{\vec{F_{on}} \cdot \vec{F_{on+1}}}{|\vec{F_{on}}||\vec{F_{on+1}}|}\right) \quad (7)$$

The first characteristic quantity arithmetic unit 114, if the angular difference θon is equal to or larger than a predetermined value, determines that the picture number n is the variation point. An implication of "the picture number n is the variation point" is that the variation point exists between the picture number n and the picture number n+1. A direction of the characteristic quantity Fo corresponds to the property of the picture, and a change in direction of the characteristic quantity Fo represents a change in property of the picture. The first characteristic quantity arithmetic unit 114 calculates the variation points as Co1, Co2, . . . from the smallest of the picture numbers. A cosine may be used in place of the angular difference. The use of the cosine leads to a decrease in calculation load.

The first characteristic quantity arithmetic unit 114 stores the characteristic quantities Fo and the variation points Co in the storage unit 140.

Operational Example of Second Characteristic Quantity Arithmetic Unit

An operational example of a second characteristic quantity arithmetic unit 124 will be described.

Figure 8:
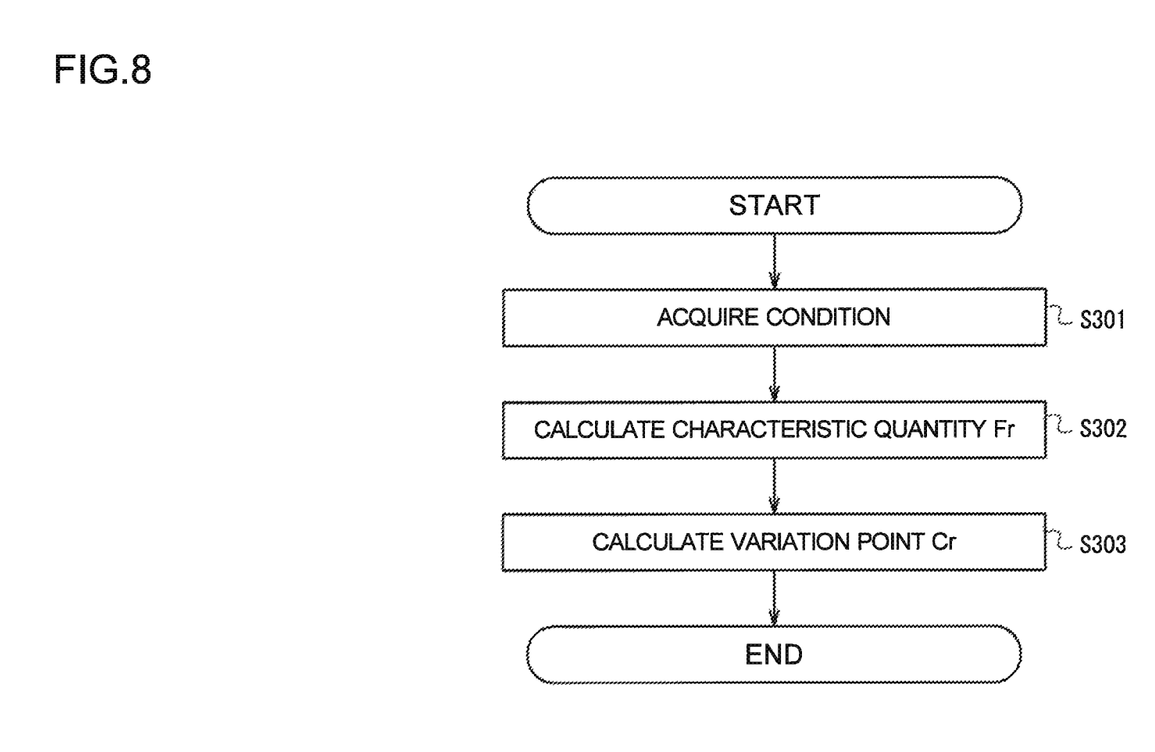
FIG. 8 is a flowchart illustrating an example of an operation flow of a second characteristic quantity arithmetic unit.

FIG. 8 is a flowchart illustrating an example of an operation flow of the second characteristic quantity arithmetic unit 124. A start of the operation flow in FIG. 8 is triggered by inputting the encoding method, the picture number, the picture type, the picture size, etc from the second extraction unit 122 to the second characteristic quantity arithmetic unit 124.

The second characteristic quantity arithmetic unit 124 acquires the encoding method, the picture number, the picture type, the picture size, etc. Further, the second characteristic quantity arithmetic unit 124 acquires conditions for calculating the characteristic quantity etc of the testing target moving picture data (S301). The conditions for calculating the characteristic quantity etc are given by, e.g., the user. The conditions for calculating the characteristic quantity etc may be stored in the storage unit 140.

The second characteristic quantity arithmetic unit 124 calculates, with respect to each picture number within the observation range, the average of the sizes of the I-pictures, the average of the sizes of the P-pictures and the average of the sizes of the B-pictures. The second characteristic quantity arithmetic unit 124 calculates, with respect to the picture number n, the vector having three components of the average of the sizes of the I-pictures, the average of the sizes of the P-pictures and the average of the sizes of the B-pictures. The second characteristic quantity arithmetic unit 124 multiplies the calculated vector by the conversion matrix. The conversion matrix is a conversion matrix for the conversion from the encoding method of the second moving picture data into the encoding method of the first moving picture data. The conversion matrix is stored in the storage unit 140. The conversion matrix is selected based on the encoding method of the second moving picture data and the encoding method of the first moving picture data. The conversion matrix is one of the conditions for calculating the characteristic quantity etc. The second characteristic quantity arithmetic unit 124 sets a vector given by multiplying the calculated vector by the conversion matrix as a characteristic quantity Frn (vector). The average of the sizes of the I-pictures specified by the picture number n is to be an average of the sizes of k-frames of I-pictures counted from the side closer to the picture number n in the I-pictures classified by the picture type. The average of the sizes of the P-pictures specified by the picture number n is to be an average of the sizes of k-frames of P-pictures counted from the side closer to the picture number n in the P-pictures classified by the picture type. The average of the sizes of the B-pictures specified by the picture number n is to be an average of the sizes of k-frames of B-pictures counted from the side closer to the picture number n in the B-pictures classified by the picture type. Herein, the value "k" is one of the conditions for calculating the characteristic quantity etc. The second characteristic quantity arithmetic unit 124 calculates the characteristic quantities Fr with respect to all the picture numbers within the observation range (S302). The characteristic quantity Fr (vector) may be normalized to the magnitude "1". Furthermore, the second characteristic quantity arithmetic unit 124 may set the average of the sizes of the I-pictures specified by the picture number n as an average of the sizes of all the I-pictures embraced by the range m peripheral to the picture number n. The same is applied to also the P-pictures and the B-pictures. About the second moving picture data, the characteristic points Fr are calculated with respect to all the picture numbers in the second moving picture data. The characteristic points Fr may also be calculated with respect to all the picture numbers with a predetermined range in the second moving picture data. One conversion matrix is prepared for one standard, in which case the conversion matrix corresponding to the encoding method of the second moving picture data becomes the conversion matrix herein.

The second characteristic quantity arithmetic unit 124 calculates a conversion point Cr of the characteristic quantity Fr (S303). The second characteristic quantity arithmetic unit 124 makes a comparison of an angular difference between the characteristic quantity Frn of the picture number n that is calculated in step S302 and a characteristic quantity Frn+1 of a picture number n+1. Both of the characteristic quantity Frn and the characteristic quantity Frn+1 are vectors, and hence an angular difference θrn is obtained as follows.

[Mathematical Expression 8]

$$\theta_{rn} = \cos^{-1}\left(\frac{\vec{F_{rn}} \cdot \vec{F_{rn+1}}}{|\vec{F_{rn}}||\vec{F_{rn+1}}|}\right) \quad (8)$$

The second characteristic quantity arithmetic unit 124, if the angular difference θrn is equal to or larger than a predetermined value, determines that the picture number n is the variation point. The implication of "the picture number n is the variation point" is that the variation point exists between the picture number n and the picture number n+1. A direction of the characteristic quantity Fr corresponds to the property of the picture, and a change in direction of the characteristic quantity Fr represents a change in property of the picture. The second characteristic quantity arithmetic unit 124 calculates the variation points as Cr1, Cr2, . . . from the smallest of the picture numbers. The cosine may be used in place of the angular difference. The use of the cosine leads to the decrease in calculation load.

The second characteristic quantity arithmetic unit 124 outputs the characteristic point Fr and the variation point Cr to the comparing unit 130. The second characteristic quantity arithmetic unit 124 may store the characteristic point Fr and the variation point Cr in the storage unit 140.

Operational Example of Comparing Unit

An operational example of the comparing unit 130 will be described.

Figure 9:
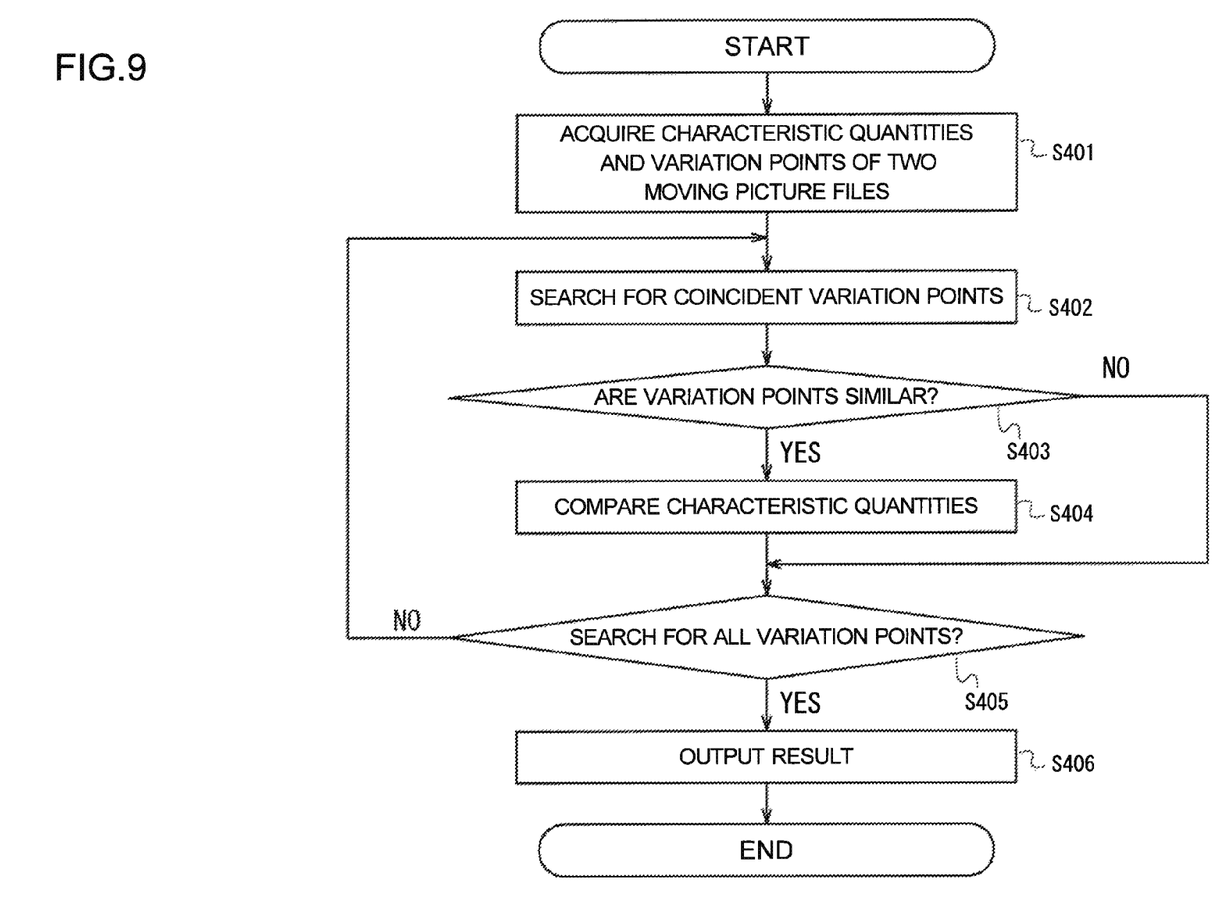
FIG. 9 is a flowchart illustrating an example of an operation flow of a comparing unit.

FIG. 9 is a flowchart illustrating an example of the operational flow of the comparing unit. A start of the operational flow in FIG. 9 is triggered by inputting items of information such as the characteristic quantity and the variation point of the first moving picture data, and the characteristic quantity and the variation point of the second moving picture data to the comparing unit 130.

In step S401, the comparing unit 130 acquires, from the storage unit 140, the characteristic quantity and the variation point of the first moving picture data defined as the referenced moving picture data. The comparing unit 130 acquires the characteristic quantity and the variation point of the second moving picture data defined as the testing target moving picture data from the second characteristic quantity arithmetic unit 124 or the storage unit 140.

In step S402, the comparing unit 130 searches for a position of a variation point within the second moving picture data, which is coincident with a position of a variation point within the first moving picture data (the position of the variation point within the observation range), in a way that sets a variation point Co1 of the first moving picture data and a variation point Cr1 of the second moving picture data as reference variation points. The comparing unit 130, when looping back from step S405, searches for a position of a variation point by shifting the reference variation point of the second moving picture data sequentially such as Cr2, Cr3. The comparing unit 130 may shift the reference point of the second moving picture data sequentially on a per picture-number basis of the second moving picture data. At this time, in step S405, it is determined whether or not variation points are searched with respect to all the picture numbers of the second moving picture data.

In step S403, the comparing unit 130 determines whether a ratio of the number of positions of the variation points within the second moving picture data, which are coincident with the positions of the variation points within the first moving picture data, to the number of variation points within the first moving picture data, is equal to or larger than a predetermined value or not. If the ratio of the number of positions of the variation points within the second moving picture data, which are coincident with the positions of the variation points within the first moving picture data, to the number of variation points within the first moving picture data, is equal to or larger than the predetermined value (S403; YES), the processing advances to step S404. Whereas if the ratio of the number of positions of the variation points within the second moving picture data, which are coincident with the positions of the variation points within the first moving picture data, to the number of variation points within the first moving picture data, is smaller than the predetermined value (S403; NO), the processing diverts to step S405.

In step S404, the comparing unit 130 compares the characteristic quantity Fo within the first moving picture data with the characteristic quantity Fr within the second moving picture data on the per picture-number basis by use of the variation points set as the reference variation points in step S403. To be specific, the comparing unit 130 calculates the angular difference between the characteristic quantity Fo within the first moving picture data and the characteristic quantity Fr within the second moving picture data on the per picture-number basis, and determines whether the smallest of the angular differences is less than a predetermined threshold value or not. If the smallest of the angular differences is less than the predetermined threshold value, the comparing unit 130 determines that the moving picture in the observation range of the first moving picture data is similar to the moving picture in the range of the second moving picture data similar thereto in terms of their variation points. Whereas if the smallest of the angular differences equal to or larger than the predetermined threshold value, the comparing unit 130 determines that the moving picture in the observation range of the first moving picture data is not similar to the moving picture in the range of the second moving picture data similar thereto in terms of their variation points.

In step S405, the comparing unit 130 determines whether or not all the variation points within the second moving picture data are used as the reference variation points in the search of step S402. If all the variation points within the second moving picture data are not used as the reference variation points (S405; NO), the processing loops back to step S402. Whereas if all the variation points within the second moving picture data are used as the reference variation points (S405; YES), the processing advances to step S406.

In step S406, the comparing unit 130 outputs the range of the second moving picture data determined to be similar in step S404 and the smallest of the angular differences between the characteristic quantities Fo and the characteristic quantities Fr. If determined to be similar a plural number of times in step S404, the comparing unit 130 outputs the range of the second moving picture data and the smallest of the angular differences between the characteristic quantities Fo and the characteristic quantities Fr with respect to the whole.

Through the operations described above, the comparing unit 130 can extract the range within the second moving picture data, which is similar to the observation range of the first moving picture data.

The user may also determine whether or not the extracted range of the second moving picture data is similar to the observation range of the first moving picture data by visually checking again the moving picture with respect to the extracted range of the second moving picture data.

The moving picture data comparing apparatus 100 is installed in, e.g., a gateway apparatus on the network, thereby enabling the extraction of the moving picture similar to the observation range of the first moving picture data from the streaming data that stream on the network.

Modified Example

Figure 10:
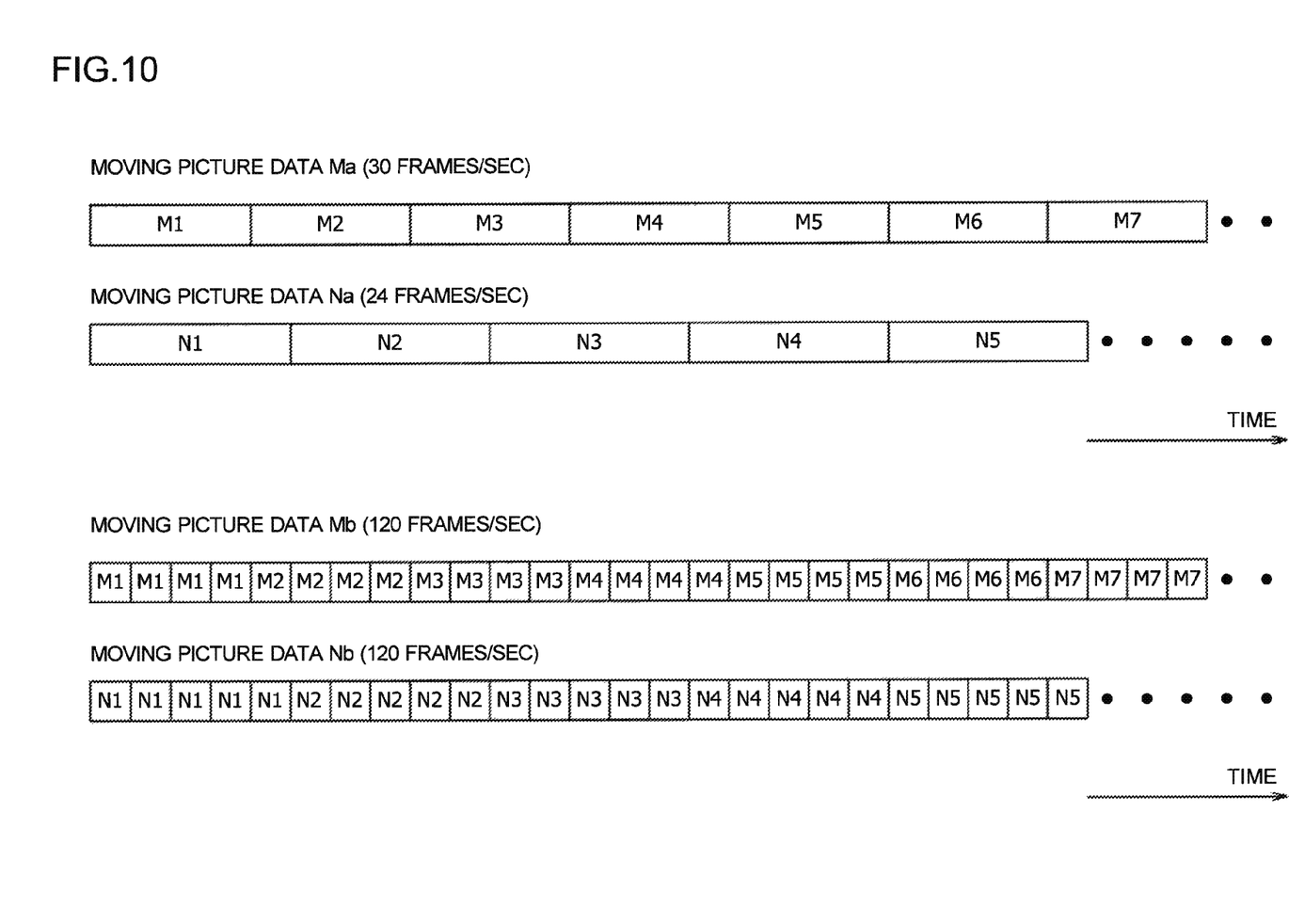
FIG. 10 is an explanatory diagram of a case where a frame rate of first moving picture data is different from a frame rate of second moving picture data.

FIG. 10 is an explanatory diagram of a case where a frame rate of the first moving picture data is different from a frame rate of the second moving picture data.

The example discussed above is based on the premise that the frame rate (the picture count per sec) of the first moving picture data is coincident with the frame rate of the second moving picture data. Such a case is, however, considered that the frame rates of the moving picture data and another moving picture data are not necessarily coincident with but different from each other. As seen in moving picture data Ma and moving picture data Na in FIG. 10, the case that the frame rate is different between the first moving picture data and the second moving picture data, will be described.

As in FIG. 10, it is assumed that the frame rate of the moving picture data Ma is 30 frames/sec, and the frame rate of the moving picture data Na is 24 frames/sec. When calculating a least common multiple (LCM) of 30 and 24, the calculation result is 120. Hence, the moving picture data Ma and the moving picture data Na are then converted into the moving picture data of which the frame rate is 120 frames/sec. The moving picture data Ma are converted, with each picture being repeated four times, into the moving picture data (moving picture data Mb) of which the frame rate is 120 frames/sec. The moving picture data Na are converted, with each picture being repeated five times, into the moving picture data (moving picture data Nb) of which the frame rate is 120 frames/sec. The moving picture data comparing apparatus 100 treats the moving picture data having the frame rate of 120 frames/sec as the first moving picture data or the second moving picture data. With this contrivance, the moving picture data comparing apparatus 100 can extract the range with the moving picture data being similar to another moving picture data by obtaining the characteristic quantities F and the variation points C in the same way as described above.

Operation and Effect of Embodiment

The moving picture data comparing apparatus 100 extracts the picture type and the size of each picture from the referenced moving picture data and calculates, based on the extracted items of information, the characteristic quantity and the variation point. Further, the moving picture data comparing apparatus 100 extracts the picture type and the size of each picture from the testing target moving picture data and calculates, based on the extracted items of information, the characteristic quantity and the variation point. Still further, the moving picture data comparing apparatus 100 compares the variation point of the referenced moving picture data with the variation point of the testing target moving picture data, and extracts the range of the testing target moving picture data with the variation point being similar to the variation point of the referenced moving picture data. The moving picture data comparing apparatus 100 compares, in the range with the variation point being similar thereto, the characteristic quantities thereof, and determines whether or not the moving picture of the testing target moving picture data is similar to the moving picture of the referenced moving picture data. The moving picture data comparing apparatus 100 can compare the moving picture data with each other, which are encoded by the different encoding methods, by calculating the characteristic quantities in a way that uses the conversion matrix.

The moving picture data comparing apparatus 100 can determine whether the contents (moving pictures) of the two sets of moving picture data are similar to each other or not without executing the decoding process of the moving picture data. The moving picture data comparing apparatus 100 compares the moving picture data with another moving picture data without carrying out the decoding process of the moving picture data, and can therefore determine whether or not the moving picture of the moving picture data is similar to the moving picture of another moving picture data with a small arithmetic load in a short period of time.

The configurations described above can be implemented by combining these configurations to the greatest possible degree.

It is feasible to provide the moving picture data comparing method of comparing the moving picture data without executing any decoding process.

DESCRIPTION OF THE REFERENCE NUMERALS AND SYMBOLS

100 moving picture data comparing apparatus
112 first extraction unit
114 first characteristic quantity arithmetic unit
122 second extraction unit
124 second characteristic quantity arithmetic unit
130 comparing unit
140 storage unit
1000 information processing apparatus
1002 processor
1004 main storage device
1006 secondary storage device
1008 input device
1010 output device
1012 communication interface device
1020 bus All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A moving picture data comparing method, comprising:
    extracting a picture type per picture frame and a picture size per picture frame from first moving picture data given by encoding a moving picture including a plurality of picture frames;
    calculating a first characteristic quantity per picture frame of the first moving picture data and a first variation point indicating a variation point of the first characteristic quantity on the basis of the extracted picture type per picture frame of the first moving picture data and the extracted picture size per picture frame of the first moving picture data;
    extracting a picture type per picture frame and a picture size per picture frame from second moving picture data given by encoding a moving picture having a plurality of picture frames;
    calculating a second characteristic quantity per picture frame of the second moving picture data and a second variation point indicating a variation point of the second characteristic quantity on the basis of the extracted picture type per picture frame of the second moving picture data and the extracted picture size per picture frame of the second moving picture data; and
    comparing the first characteristic quantity and the first variation point with the second characteristic quantity and the second variation point, and thus determining whether or not the moving picture of the first moving picture data is similar to the moving picture of the second moving picture data.

2. The moving picture data comparing method according to claim 1, wherein the first characteristic quantity is calculated by use of a first conversion matrix based on an encoding method of the first moving picture data, and the second characteristic quantity is calculated by use of a second conversion matrix based on an encoding method of the second moving picture data.

3. A non-transitory computer-readable recording medium having stored therein a program for causing a computer to execute a moving picture data comparing process, the moving picture data comparing process comprising:

extracting a picture type per picture frame and a picture size per picture frame from first moving picture data given by encoding a moving picture including a plurality of picture frames;

calculating a first characteristic quantity per picture frame of the first moving picture data and a first variation point indicating a variation point of the first characteristic quantity on the basis of the extracted picture type per picture frame of the first moving picture data and the extracted picture size per picture frame of the first moving picture data;

extracting a picture type per picture frame and a picture size per picture frame from second moving picture data given by encoding a moving picture having a plurality of picture frames;

calculating a second characteristic quantity per picture frame of the second moving picture data and a second variation point indicating a variation point of the second characteristic quantity on the basis of the extracted picture type per picture frame of the second moving picture data and the extracted picture size per picture frame of the second moving picture data; and comparing the first characteristic quantity and the first variation point with the second characteristic quantity and the second variation point, and thus determining whether or not the moving picture of the first moving picture data is similar to the moving picture of the second moving picture data.

4. The non-transitory computer-readable recording medium according to claim 3, wherein the first characteristic quantity is calculated by use of a first conversion matrix based on an encoding method of the first moving picture data, and the second characteristic quantity is calculated by use of a second conversion matrix based on an encoding method of the second moving picture data.

5. A moving picture data comparing apparatus comprising:

a first extraction unit to extract a picture type per picture frame and a picture size per picture frame from first moving picture data given by encoding a moving picture including a plurality of picture frames;

a first characteristic quantity arithmetic unit to calculate a first characteristic quantity per picture frame of the first moving picture data and a first variation point indicating a variation point of the first characteristic quantity on the basis of the extracted picture type per picture frame of the first moving picture data and the extracted picture size per picture frame of the first moving picture data;

a second extraction unit to extract a picture type per picture frame and a picture size per picture frame from second moving picture data given by encoding a moving picture having a plurality of picture frames;

a second characteristic quantity arithmetic unit to calculate a second characteristic quantity per picture frame of the second moving picture data and a second variation point indicating a variation point of the second characteristic quantity on the basis of the extracted picture type per picture frame of the second moving picture data and the extracted picture size per picture frame of the second moving picture data; and a comparing unit to compare the first characteristic quantity and the first variation point with the second characteristic quantity and the second variation point, and thus determine whether or not the moving picture of the first moving picture data is similar to the moving picture of the second moving picture data.

6. The moving picture data comparing apparatus according to claim 5, wherein the first characteristic quantity is calculated by use of a first conversion matrix based on an encoding method of the first moving picture data, and the second characteristic quantity is calculated by use of a second conversion matrix based on an encoding method of the second moving picture data.

\* \* \* \* \*